United States Patent Office 3,264,243
Patented August 2, 1966

3,264,243
VINYL BASE ADHESIVE COMPOSITIONS WITH IMPROVED WATER RESISTANCE
Herman Knieriem, Jr., Midland, Mich., assignor to The Dow Chemical Company, Midland, Mich., a corporation of Delaware
No Drawing. Filed Mar. 14, 1962, Ser. No. 179,764
6 Claims. (Cl. 260—29.6)

This application is a continuation-in-part of my copending application Serial No. 104,207, filed April 20, 1961, and now abandoned.

The present invention pertains to new adhesive compositions. More particularly the present invention concerns vinyl adhesives and vegetable protein adhesives having markedly improved water resistance.

It has now been found that the water resistance of vinyl adhesives and vegetable protein adhesives can be improved by adding to conventional adhesives of the classes named an alkylated phenyl ether sulfonate having the general formula

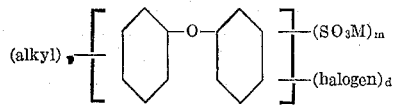

wherein "alkyl" represents an alkyl radical having from 8 to 18 carbon atoms, $p$ is an integer from 1 to 2; halogen represents chlorine or bromine; $d$ represents an integer from 0 to 1, M represents an alkali or alkaline earth metal, and $m$ represents an integer from 1 to 3. Thus, there is included the alkali metal alkylated phenyl ether sulfonates having from 8 to 18 carbon atoms in the alkyl chain, the alkali metal dialkylated phenyl ether sulfonates, the alkali metal alkylated phenyl ether disulfonates, the alkali metal dialkylated phenyl ether disulfonates, and their chloro and bromo derivatives, and the like, and the alkaline earth alkylated phenyl ether sulfonates, the alkaline earth dialkylated phenyl ether sulfonates, the alkaline earth alkylated phenyl ether disulfonates, and the like.

The classes of adhesives which exhibit this markedly improved property when modified in the aforesaid manner are the vegetable protein adhesives which include adhesives based on soybean protein, zein protein, and the like, as well as the vinyl adhesives which include polyvinyl acetate, polyvinyl butyral, polyvinyl ethers and copolymers of polyvinyl acetate and polyvinyl chloride, and the like.

The modifying agents which can be employed in accordance with the present invention are the alkylated phenyl ether sulfonate alkali metal salts and alkaline earth metal salts such as for example: monochlorododecylphenyl ether sulfonate, sodium salt; monobromododecylphenyl ether sulfonate, potassium salt; dodecylphenyl ether sulfonate, sodium salt; nonylphenyl ether sulfonate, potassium salt; octyldecylphenyl ether sulfonate, sodium salt; monochlorododecylphenyl ether sulfonate, calcium salt; monobromodidodecylphenyl ether sulfonate, magnesium salt; and the like. Thus one can employ any alkali metal or alkaline earth metal $C_8$ through $C_{18}$ mono- or dialkyl phenyl ether mono-, di- or trisulfonate, e.g., lithium, sodium, potassium, rubidium, cesium, calcium, magnesium, strontium, barium salts of the respective acids although the sodium, potassium, calcium, and magnesium salts are preferred since they are more easily prepared from more readily available and less expensive materials.

The following examples illustrate the present invention but are not to be construed as limiting:

EXAMPLE 1

A protein base adhesive was prepared according to manufacturer's mixing direction in the following manner: 100 parts of a vegetable protein (soybean protein) aqueous adhesive (Casco W-1691 manufactured by Borden Company), 180 parts of water and 5 parts of Dowicide 7 (a phenol base fungicide manufactured by The Dow Chemical Company) were mixed for 5 minutes and then 185 parts of water at 50°–60° F. were added and mixing continued for 2 to 3 minutes. Lime in water (12 parts lime and 24 parts water) was added and the mixture stirred for 5 minutes, then 25 parts of sodium silicate and 1.75 parts of carbon disulfide in carbon tetrachloride (75:25 ratio) were added and stirring continued for 5 minutes. Thereafter 14 parts of 50% NaOH solution were added and the resulting mixture blended on a Waring Blender until smooth and free from lumps. Various percentages of dodecylphenyl ether monosulfonate sodium salt were added to aliquot portions of the adhesive and the modified adhesives spread on panels 6" x 6" x ⅛" to make 3-ply panel board. The glued panels were placed in a cold press for 30 minutes at a pressure of 200 p.s.i., then cured under atmospheric pressure and room temperature for 24 hours.

To test for water resistance, 1" x 3¼" samples were cut from each 6" x 6" panel and immersed in cold water. If after 8 hours the strips were still bonded, the water was raised to boiling and soaking continued. The time for delamination is recorded in the following table. A panel glued with an adhesive having no dodecylphenyl ether sulfonate sodium salt, was also run as a control and the results of the immersion test are also recorded.

| Ex. No. | Percent by Weight of Dodecylphenyl Ether Sodium Sulfonate | Total Time in Minutes Before Delamination (Average of 3 Samples) |
|---|---|---|
| 1 | 0.5 | 180 |
| 2 | 1.0 | 560 |
| 3 | 3.0 | 5,460 |
| 4 | 5.0 | 4,052 |
| 5 | [1] 2.25 | 5,460 |
| 6 | [1] 4.5 | 600 |
| 7 | [1] 6.75 | 600 |
| 8 | 0.0 (Control) | 150 |

[1] Introduced as a 45% aqueous solution in an amount sufficient to provide the indicated amount of the active ingredient.

EXAMPLE 9–11

Unbleached kraft paper was cut into 1" x 4" strips. Polyvinyl acetate adhesive (a commercial adhesive obtained from Williamson Adhesives Company) containing various amounts of additive was applied to 1 sq. inch of the end of one strip. Another 1" x 4" strip was placed with 1 sq. inch of its end imposed upon the glued area. The net result being a sample 7" long with 1 sq. inch of glued area. This sample then was pressed for 30 minutes under a 1 kg. weight. The weight was then removed and the strip allowed to cure for 72 hours. The sample was then weighted and suspended in boiling water. If delamination had not occurred within 8 hours the sample was suspended in cold water overnight, and boiling was resumed the following day. The time elapsed until the sample completely separated is recorded as the delamination time in the table below:

| Ex. No. | Percent by Weight of Dodecylphenyl Ether Sodium Sulfonate | Total Time in Minutes Before Delamination (Average of 2 Samples) |
|---|---|---|
| 9 | 0.5 | 20 |
| 10 | 1.0 | [1] 48 |
| 11 | (Control) | 2.5 |

[1] Still laminated.

EXAMPLES 12–15

There was added to a polyvinyl acetate emulsion adhesive (hereinafter referred to as PVAc) (obtained from Shawinigan Resins Corporation) 1.5% by weight of dodecylphenyl ether sulfonate sodium salt. This adhesive composition was used to prepare 3 ply board from 12" x 12" x ⅛" matched panel rotary cut Douglas fir veneer. The panels were prepared in a manner similar to that described in Example 1. The weight of glue employed was determined by weighing the samples before and after gluing and was found to be about 58 pounds per 1000 square feet of double glue line. The panels were cold pressed under 200 lbs./in.² pressure for 30 minutes and then cut into 1" x 3¼" shear strips and used in the following tests. Blank specimens were prepared employing the PVAc adhesive without any additive.

Water resistance test

The water resistance of the adhesive system was evaluated by completely immersing the shear strips in water at room temperature, and measuring the time required for the strips to delaminate. A test tube clamp was attached to the end of the shear strip, so that the strip would remain erect, completely beneath the surface of the water for the duration of the tests. The delamination time shown in the following table summary and the percent improvement of the adhesives water resistance containing the additives are set forth.

Dry bond strength test

In this test, the samples are clamped firmly in the jaws of the Instron machine test apparatus. The machine is started and the jaws separated at a rate of 0.1 inch per minute. The data obtained is set forth in the summary table below.

Wet bond strength tests

Shear strip specimens were soaked in water at room temperature for 30 minutes prior to testing in the manner described in the dry bond strength test. The results are set forth in the summary table below.

High humidity bond strength tests

Shear strip specimens were stored in a tropical chamber, 95% humidity at 80° F., for three days. The samples were then dried for 20 hours, and tested on the Instron machine. The results are set forth in the summary table below.

Summary

The following table shows the improvement in the water resistance and the bond strength of a polyvinyl acetate adhesive that may be obtained using 1.5% of the Na salt of dodecylphenyl ether sulfonate.

| Ex. No. | Test | PVAc Blank Average | PVAc + 1.5% Na salt of dodecylphenyl ether sulfonate Average | Percent Improvement |
|---|---|---|---|---|
| 12 | Water Resistance | 362 | 1,559 | 331 |
| 13 | Dry Bond Strength: | | | |
| | Shear Pressure | 205 | 257 | 25.4 |
| | Percent Wood Failure | 43 | 66 | 53.5 |
| 14 | Wet Bond Strength: | | | |
| | Shear Pressure | 141 | 210 | 49.0 |
| | Percent Wood Failure | 22 | 54 | 61.6 |
| 15 | Humidity Bond Strength: | | | |
| | Shear Pressure | 152 | 201 | 32.2 |
| | Percent Wood Failure | 17 | 61 | 259.0 |

EXAMPLE 16

A formulation was prepared as follows:

100 g. of polyvinyl acetate adhesive (commercial preparation obtained from Williams Adhesives Company),
4 g. of 25% solution of surface active material.

Thus the adhesive compositions contain 1% by weight of active surfactant.

The so-prepared adhesives are cast into a 20 mil thickness film 5 inches wide perpendicular to the length of an 18 x 5½ inch plate glass panel. The films were allowed to age for 24 hours. The film and glass were then placed in the trough of a Gardner straight-line scrubber. A photographic grade cellulose sponge evenly wetted with 25 ml. of deionized water was inserted into the scrubbing attachment and the apparatus started. Between 60 and 70 strokes, 1 ml. of deionized water was added to the surface of the film via a burette. Another 1 ml. increment was added between 80 and 90 strokes, and 18 ml. in 2 ml. increments was added between 100 and 200 strokes. The test was stopped when the film disintegrated or when a prescribed number of strokes was completed.

| Surfactant: | Strokes to failure of film, two replicates |
|---|---|
| Blank (4 g. H₂O added to make up to weight of compositions and surfactant) | 42, 41 |
| Alkylbenzene sulfonate | 178, 68 |
| Ca Salt of dodecylphenyl ether disulfonate | 406, 457 |
| Mg Salt of dodecylphenyl ether disulfonate | 446, 433 |

I claim:

1. An improved, water resistant system comprising vinyl base adhesive and an amount of an alkyl aryl sulfonate having the formula

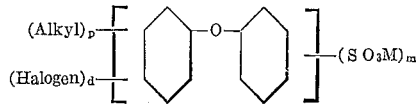

wherein "alkyl" represents an alkyl radical having from 8 to 18 carbon atoms, $p$ represents an integer from 1 to 2, "halogen" represents a halogen atom having an atomic number from 17 to 35, $d$ represents an integer from 0 to 1, M represents a member selected from the group consisting of alkali metal and alkaline earth metals and $m$ represents an integer from 1 to 3 effective to improve the water resistance of the adhesive when set.

2. A composition as set forth in claim 1 wherein said sulfonate is sodium dodecylphenyl ether sulfonate.

3. A composition as set forth in claim 1 wherein said sulfonate is sodium dodecylchlorophenyl ether sulfonate.

4. A composition as set forth in claim 1 wherein said sulfonate is calcium dodecylphenyl ether disulfonate.

5. A composition as set forth in claim 1 wherein said sulfonate is magnesium dodecylphenyl ether disulfonate.

6. The adhesive defined in claim 1 wherein the adhesive base is polyvinylacetate.

References Cited by the Examiner

UNITED STATES PATENTS

| | | | |
|---|---|---|---|
| 2,459,708 | 1/1949 | Lundgren | 106—153 |
| 2,769,713 | 11/1956 | Wilson | 260—29.6 |
| 2,887,395 | 5/1959 | Rowe et al. | 106—154 |
| 2,990,375 | 6/1961 | Steinhauer et al. | 252—138 |
| 2,992,999 | 7/1961 | Smith et al. | 260—512 |

MURRAY TILLMAN, *Primary Examiner.*

MORRIS LIEBMAN, *Examiner.*

D. J. ARNOLD, W. J. BRIGGS, SR., *Assistant Examiners.*